3,288,787
SUBSTITUTED OXAZOLIDINONES
Giangiacomo Massaroli, Milan, Italy, assignor, by mesne assignments, to Inphar S.A., Mesocco, Switzerland
No Drawing. Filed July 25, 1963, Ser. No. 297,696
Claims priority, application Italy, Aug. 1, 1962, 15,418/62
12 Claims. (Cl. 260—240)

This invention relates to organic compounds having valuable therapeutic properties, and in particular to substituted oxazolidinones.

The invention comprises a substituted oxazolidinone having the formula

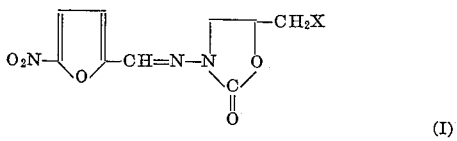

(I)

wherein X represents one of the groups —SR and —SO$_2$R, R being a saturated or unsaturated alkyl radical containing from one to six carbon atoms. The invention also comprises processes of producing such N-(5'-nitro-2'-furfurylidene)-3-amino-5-substituted - 2 - oxazolidinones, and therapeutic formulations containing such substituted oxazolidinones.

The N-(5'-nitro - 2' - furfurylidene) - 3 - amino-5-substituted - 2 -oxazolidinones of the invention may be produced by reacting a hydroxy-propyl-hydrazine having the formula

NH$_2$—NH—CH$_2$—CH(OH)—CH$_2$X wherein X has the previous significance, with a dialkyl carbonate, for example dimethyl or diethyl carbonate, to produce an 3-amino-5-substituted-2-oxazolidinones having the formula

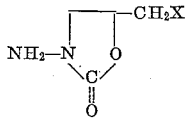

wherein X has the previous significance, and reacting this product with 5-nitro-2-furfuraldehyde to yield the desired N-5'-nitro-2'-furfurylidene) - 3 - amino - 5 - substituted-2-oxazolidinones. The reaction of the hydroxy - propyl-hydrazine with the dialkyl carbonate may be carried out by heating together in the presence of a catalytic amount of condensing alkali at a temperature in the range from 80° to 110° C., preferably continuously distilling of the alcohol resulting from the reaction. The amino - oxazolidinone may be isolated if desired, or, alternatively, the product of reacting the hydroxy-propyl-hydrazine with the dialkyl carbonate may be treated directly with 5-nitro-2-furfuraldehyde. In producing the N-(5'-nitro - 2' - furfurylidene)-3-amino-5-substituted - 2 - oxazolidinones, of the invention, the intermediate 3-amino-5-substituted-2-oxazolidinones may be condensed in an acid water-alcohol medium with 5-nitro-2-furaldehyde added as such or prepared in situ by saponifying the diacetate derivative.

The hydroxy-propyl-hydrazines, which are also new compounds, may be themselves prepared by heating the corresponding epoxypropyl compounds having the formula

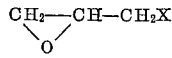

wherein X has the previous significance, for two hours at a temperature in the range from 40° to 100° C., with an excess of hydrazine hydrate solution having a concentration ranging from 75% to 98%.

The hydroxy-propyl-hydrazines may also be prepared directly from the corresponding chloro - hydroxy - propyl compound having the formula CH$_2$Cl—CH·OH—CH$_2$X wherein X has the previous significance, by reaction with an excess of a hydrazine, an alkali metal hydroxide, for example, at a temperature in the range from 40° to 100°.

The hydroxy-propyl-hydrazine used as a starting material need not be isolated; the product of the reaction may itself be reacted directly with the dialkyl carbonate.

The chloro-hydroxy-propyl compounds described in the previous paragraph may be prepared by the method described by Todsen, Pollard and Lietz in the Journal of the American Chemical Society, volume 72 (1950), at page 4000. The hydroxy-propyl-hydrazines may also be prepared directly from the corresponding chloro-hydroxy-propyl compound described in the previous paragraph by reaction with a mixture of hydrazine and alkali metal hydroxide, for example at a temperature in the range from 40° to 100° C. If the N-(5'-nitro-2'-furfurylidene)-3-amino-5-substituted - 2 - oxazolidinones of the invention are to be produced, the intermediate hydroxy-propyl-hydrazine need not be isolated; the product of the reaction used to prepare it may itself be reacted directly with the dialkyl carbonate.

The N-(5'-nitro-2'-furfurylidene) - 3 - amino - 5 - substituted - 2 - oxazolidinones of the invention are yellow crystalline compounds. They are only sparingly soluble in the usual organic solvents and may be easily purified by crystallizing from acetic acid, mixtures of various proportions of acetic acid and water, alcohol and diluted aqueous dimethylformamide. The compounds possess valuable pharmacological and therapeutic properties, especially when they are used as bactericide and bacteriostatic agents and, more particularly, as anti-*Trichomonas vaginalis* and anti-*Trichomonas foetus* agents. Test data concerning the bacteriostatic action of some new compounds of the general formula having the specified side-chain X are shown in the following table for illustrative purposes.

| X | Minimum active concentration, A/ml. | | | |
|---|---|---|---|---|
| | Escherichia coli | Shigella dysenteriae | Bacillus subtilis | Staphylococcus Oxford 114 |
| —SCH$_3$ | 2.5 | 1 | 1 | 0.5 |
| —SCH$_2$CH$_3$ | 10 | 10 | 25 | 2.5 |
| —SCH$_2$—CH=CH$_2$ | 10 | 10 | 10 | 7.5 |
| —SCH$_2$—CH$_2$—CH$_3$ | 50 | 10 | 10 | 25 |
| —SCH(CH$_3$)$_2$ | 50 | 25 | 25 | 25 |
| —SCH$_2$CH$_2$—CH$_2$—CH$_3$ | 50 | 25 | 5 | 10 |
| —SO$_2$CH$_3$ | 5 | 10 | 5 | 5 |
| —SO$_2$CH$_2$CH$_3$ | 5 | 5 | 2.5 | 5 |
| —SO$_2$CH$_2$CH$_2$CH$_3$ | 50 | 25 | 25 | 25 |
| —SO$_2$CH(CH$_3$)$_2$ | 25 | 10 | 25 | 10 |
| —SO$_2$(CH$_2$)$_3$CH$_3$ | 50 | 50 | 5 | 25 |

The anti-trichononas action of the specific substituted oxazolidinone N-(5'-nitro-2'-furfurylidene)-3-amino-5-methylmercaptomethyl-2-oxazolidinone is particularly marked, the activity of which against *Trichomonas vaginalis* in vitro being still significant at a concentration of 0.05α/cc. The N-(5'-nitro-2'-furfurylidene)-3-amino-5-substituted-2-oxazolidinones, when orally administered to test-animals or to humans, are easily absorbed and eliminated through the urine, which has been found to possess bactericide and anti-Trichomonas activity. Furthermore, the serum of treated animals shows good anti-Trichomonas action. The compounds are therefore especially useful in treating bacterial diseases of the urinary system and Trichomonas disease, both when locally or generally administered.

The N-(5'-nitro-2'-furfurylidene)-3-amino-5-substituted-2-oxazolidinones of the invention may be prepared by conventional methods into pharmaceutical or therapeutic formulations containing the substituted oxazolidinone as active ingredient, using an acceptable conventional carrier or diluent.

In treating diseases caused in humans by the above-mentioned pathogenous agents, the preferred administering means for topical gynaecological purposes is a vaginal tablet containing 25 mgr. of the active ingredient, administered once or twice a day. In fact, such a dose has proved to have a sure therapeutic action in any case.

Another satisfactory means is the vaginal dried or liquid spray.

500 or at most 750 mgr. pro die have proved to be sufficient when administered per os on a full stomach in 250 mgr. doses. In treating Trichomonas diseases, 100% positive results have been achieved by administering the concerned product per os for 5–7 days to the female and her partner at the same time, together with topical treatment of the female in the said doses.

Using the above-suggested dosages, Trichomonas, bacteria, and fungi vaginal diseases, both pure and combined, could be successfully treated.

Even pregnant females have borne such a treatment very well. Excellent results have been obtained also in treating erosive cervical diseases and cervical canal phlogosis.

During the per os treatment, the urethral localizations, both symptomatic in the female and asymptomatic in the male, have steadily disappeared. The same dosages (500–750 mgr. pro die) are used in the urinary system diseases; on the contrary, doses from 0.02% to 1% are employed, as a salve, ointment, powder or solution, in dermatology and for topical applications.

The following formulations are examples of administering means compositions containing the substituted oxazolidinones according to the present invention.

(1) 250 mgr. oral compresses: Mgr.
Substituted oxazolidinone _____ 250
Starch _____ 130
Talc _____ 10

(2) 200 mgr. capsules:
Substituted oxazolidinone _____ 200
Magnesium stearate _____ 10

(3) 25 mgr. vaginal tablets:
Substituted oxazolidinone _____ 25
Lactose _____ 750
Dextrose _____ 300
Starch _____ 250

(4) 2% oral suspension: Gr.
Substituted oxazolidinone _____ 2
Glycerol _____ 2
70% sorbitol _____ 20
Methylparaben _____ 0.1
Propylparaben _____ 0.01
Medium viscosity CMC (carboxymethylcellulose) _____ 0.5
Water to 100 ml.

(5) 1% ophthalmic ointment:
Substituted oxazolidinone _____ 1
Vaseline _____ 75
Vaseline oil _____ 24

(6) 0.2% topical ointment:
Substituted oxazolidinone _____ 0.2
Lanoline _____ 25
Vaseline _____ 40
Vaseline oil _____ 35

(7) 0.2% otologic solution:
Substituted oxazolidinone _____ 0.2
Glycerol _____ 90
Water _____ 10

(8) 0.2% topical powder:
Substituted oxazolidinone _____ 0.2
Lactose to 100.

The following examples further illustrate the invention.

*Example 1*

35 grams (0.25 mole) of methyl-(2-hydroxy-3-chloropropyl) sulphide were added, while stirring, to a solution of 10 grams (0.25 mole) of sodium hydroxide in 62.5 grams of 98% hydrazine hydrate (1.25 moles) which were heated to 80° C., the addition rate being controlled so that the temperature did not exceed 95° C.

After the addition was completed, the excess hydrazine was carefully removed under reduced pressure, the residue being then diluted with absolute ethyl alcohol and filtered to remove the sodium chloride resulting from the reaction. The solvent was removed under reduced pressure and the residue distilled in vacuo (mechanical pump) to give 26.4 grams (86%) of 3-methylmercapto-2-hydroxy-propyl hydrazine boiling at 128–130°/1 mm.

*Analysis.*—Found: C, 34.99; H, 8.7; N, 20.3. $C_4H_{12}N_2OS$ requires: C, 35.27; H, 8.88; N, 20.57.

In the same way, the corresponding compound containing the group $SCH_2—CH=CH_2$ instead of the methylmercapto group, was prepared as a colourless liquid boiling at 138–140° C./1 mm.

*Analysis.*—Found: C, 44.08; H, 8.72; N, 17.05. $C_6H_{14}N_2OS$ requires: C, 44.41; H, 8.698; N, 17.27.

*Example 2*

In a flask fitted with a reflux condenser, mechanical stirrer and thermometer, 83.7 grams (1.1 moles) of isopropyl mercaptan, 92 grams (1 mole) of epichlorohydrin and 2 grams of dry powdered zinc chloride were added. The reaction mixture was constantly stirred and heated to 70–80° C. until a strong reaction began, and was then cooled in a water bath, so that a temperature below 100° C. was maintained. After the heat generation ceased, the reaction mixture was further heated in a boiling steam-bath for 1 hour, and distilled in vacuo to give 146 grams (84%) of the product; isopropyl-(2-hydroxy-3-chloropropyl) sulphide, B.P. 73–75°/0.5 mm.

*Analysis.*—Found: C, 42.58; H, 7.49. $C_6H_{13}ClOS$ requires: C, 42.72; H, 7.77.

168 grams (1 mole) of the isopropyl-(2-hydroxy-3-chloropropyl) sulphide, cooled in an ice-bath, a solution of 280 grams (5 moles) of KOH in 350 ml. of water were added with stirring, the addition rate being adjusted so that the temperature did not exceed 15–20° C. At the end of this time, the reaction product was extracted with ether, and the ether fraction was washed with water to the neutral end point, and dried over anhydrous sodium sulphate. The filtrate was then distilled in vacuo to yield 81 grams (65%) of isopropyl-(2,3-epoxypropyl) sulphide, boiling at 73–75° C./15 mm.

*Analysis.*—Found: C, 54.52; H, 9.15. $C_6H_{12}OS$ requires: C, 54.5; H, 9.15.

To 62.5 grams of 98% hydrazine hydrate (1.25 moles) heated to 90° C., 33 grams of the iso-propyl-(2,3-epoxypropyl) sulphide (0.25 mole) were added in small portions, while stirring. The reaction mixture was further stirred and heated for 2 hours, the excess hydrazine then being removed under reduced pressure and the oily residue distilled in vacuo (mechanical pump) to yield 36 grams (88%) of 3-isopropylmercapto-2-hydroxy-propyl hydrazine, boiling at 142° C./1 mm.

Analysis.—Found: C, 43.38; H, 9.6; N, 16.89. $C_6H_{16}N_2OS$ requires: C, 43.87; H, 9.82; N, 17.05.

In the same way, similar compounds containing other mercapto side chains, instead of the isopropyl mercapto chain, were obtained. The compound having the side chain $SC_2H_5$ (B.P. 1360/1 mm.; M.P. 37–40° C.), had Analysis.—Found: C, 39.59; H, 9.38; N, 18.58. $C_5H_{14}N_2OS$ requires: C, 39.97; H, 9.39; N, 18.65.

The compound having the side chain $SCH_2CH_2CH_3$ (B.P. 158–160° C./2.5 mm.; M.P. 35–38° C.), had Analysis.—Found: C, 43.42; H, 9.54; N, 17.14. $C_6H_{16}N_2OS$ requires: C, 43.87; H, 9.82; N, 17.05.

The compound having the side chain $SCH_2CH_2CH_2CH_3$ (B.P. 144–146° C./1 mm.; M.P. 38–40° C.), had Analysis.—Found: C, 47.61; H, 9.97; N, 15.37. $C_7H_{18}N_2OS$ requires: C, 47.15; H, 10.17; N, 15.71.

Example 3

To an ice-cooled solution of 84 grams (0.5 mole) of isopropyl-(2-hydroxy-3-chloropropyl) sulphide in 400 pl. of glacial acetic acid, were slowly added 400 ml. of 30% hydrogen peroxide, the addition rate being adjusted to avoid temperatures higher than 25–30° C. After the addition was completed, the reaction mixture was allowed to stand for about two hours, after which the solvent was removed under reduced pressure, to give 90 grams (90%) of an oily residue, which then solidified. The crude product melted at 47–99° C. and was crystallized from water to obtain white crystalline isopropyl-(2-hydroxy-3-chloropropyl) sulphone, melting at 54–55° C.

Analysis.—Found: C, 35.87; H, 6.49. $C_6H_{13}ClO_3S$ requires: C, 35.9; H, 6.53.

100 grams of isopropyl(2-hydroxy - 3 - chloropropyl) sulphone (0.5 mole) were dissolved in 200 ml. of water. To the resulting solution, after cooling in an ice-bath, 200 ml. of 5 N NaOH were added in small portions.

The reaction mixture was allowed to stand overnight, and then filtered under reduced pressure. The residue was crystallized from acetone to give 34.5 grams (42%) of isopropyl-(2,3-epoxypropyl) sulphone, as white needle-shaped crystals melting at 713° C.

Analysis.—Found: C, 44; H, 7.12. $C_6H_{12}O_3S$ requires: C, 43.88; H, 7.36.

A solution of 16.4 grams (0.1 mole) of the isopropyl-(2,3-epoxypropyl) sulphone in 50 grams (1 mole) of hydrazine hydrate was refluxed for 2 hours. The excess hydrazine was then removed under reduced pressure to give an oily residue, a portion of which was distilled in vacuo (mechanical pump) to obtain a pure sample to be used for analytic purposes. A semi-solid product, 3-isopropylsulphonyl - 2 - hydroxypropyl hydrazine, was obtained, which boiled at 186–188° C./1 mm.

Analysis.—Found: N, 14.74. $C_6H_{16}N_2O_3S$ requires: N, 14.27.

The similar compounds having side chains —$SO_2CH_3$, —$SO_2C_2H_5$, —$SO_2CH_2CH_2CH_3$, and

—$SO_2CH_2CH_2CH_2CH_3$ instead of the isopropylsulphonyl group, were produced using the same procedure. These products were then directly used as starting materials to produce the corresponding substituted oxazolidinones of the present invention.

Example 4

11.8 grams of diethyl carbonate (0.1 mole) and a solution of sodium methoxide prepared from 0.12 gram of sodium in 4 cubic centimetres of anhydrous methanol, were added to 13.2 grams of 3-methylmercapto-2-hydroxy-propyl hydrazine.

After the reaction vessel had been fitted with a Liebig condenser, the reaction mixture was heated by means of an oil bath which was gradually heated up to 110° C., to remove firstly methyl alcohol and then ethyl alcohol formed during the reaction. After about two-thirds of the theoretical amount of ethyl alcohol had been distilled off, the heating was discontinued and the reaction mixture was diluted with 50 cubic centimetres of ethyl alcohol and poured into a 5-nitro-2-furfuraldehyde solution prepared by boiling for 30 minutes 0.1 mole of nitrofurfuraldehyde diacetate in 100 ml. of ethyl alcohol and 50 ml. of 1:10 sulphuric acid. A yellow crystalline precipitate was immediately formed, which, after crystallization from acetic acid, melted at 182° C. and consisted of N-(5′-nitro-2′-furfurylidene)-3-amino - 5 - methylmercapto-methyl-2-oxazolidinone.

Analysis.—Found: N, 14.71; S, 11.12. $C_{10}H_{11}N_3O_5S$ requires: N, 14.73; S, 11.34.

In the same way, any compound of the general formula I may be produced. The following table gives the main properties of other such compounds having the various specified side chains X instead of the methylmercapto-methyl side chain.

| X | Empirical formula | M.P. (° C.) | N, percent | | S, percent | |
|---|---|---|---|---|---|---|
| | | | Required | Found | Required | Found |
| —$SC_2H_3$ | $C_{11}N_{13}N_3O_5S$ | 150 | 14.04 | 13.88 | 10.83 | 10.41 |
| —$SCH_2CH_2CH_3$ | $C_{12}H_{15}N_3O_5S$ | 148 | 13.41 | 13.02 | 10.23 | 10.19 |
| —$SCH(CH_3)_2$ | $C_{12}H_{15}N_3O_5S$ | 170 | 13.41 | 13.26 | 10.23 | 10.05 |
| —$SCH_2$—$CH$=$CH_2$ | $C_{12}H_{13}N_3O_5S$ | 118 | 13.50 | 13.56 | 10.30 | 10.05 |
| —$SCH_2CH_2CH_2CH_3$ | $C_{13}H_{17}N_3O_5S$ | 134 | 12.84 | 12.68 | 9.79 | 9.68 |
| —$SO_2CH_3$ | $C_{10}N_{11}N_3O_7S$ | 195 | 13.27 | 13.15 | 10.10 | 9.88 |
| —$SO_2C_2H_5$ | $C_{11}H_{13}N_3O_7S$ | 159 | 12.68 | 12.34 | 9.67 | 9.63 |
| —$SO_2CH_2CH_2CH_3$ | $C_{12}H_{15}N_3O_7S$ | 158 | 12.17 | 12.18 | 9.27 | 9.21 |
| —$SO_2CH(CH_3)_2$ | $C_{12}H_{15}N_3O_7S$ | 180 | 12.17 | 12.09 | 9.27 | 9.19 |
| —$SO_2CH_2CH_2CH_2CH_3$ | $C_{13}H_{17}N_3O_7S$ | 150 | 11.69 | 11.38 | 8.92 | 8.53 |

What I claim is:

1. N-(5′-nitro-2′-furfurylidene)-3-amino-5 - substituted 2-oxazolidinone having the formula

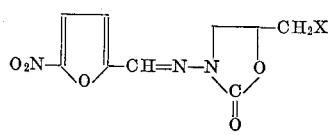

wherein X represents one of the groups—SR and —$SO_2R$, R being a saturated or monoethylenically unsaturated alkyl radical containing from one to six carbon atoms.

2. N-(5′-nitro-2′-furufylidene)-3 - amino - 5 - methyl-mercapto-methyl-2-oxazolidinone.

3. N-(5′-nitro-2′-furfurylidene)-3-amino - 5 - ethylmer-captomethyl-2-oxazolidinone.

4. N-(5′-nitro-2′-furfurylidene)-3-amino - 5 - allymer-captomethyl-2-oxazolidinone.

5. N-(5′-nitro-2′-furfurylidene)-3-amino-5 - n - propyl-mercaptomethyl-2-oxazolidinone.

6. N-(5'-nitro-2'-furfurylidene)-3-amino-5 - isopropylmercaptomethyl-2-oxazolidinone.

7. N-(5'-nitro-2'-furfurylidene)-3-amino - 5 - n - butylmercaptomethyl-2-oxazolidinone.

8. N-(5'-nitro-2'-furfurylidene)-3-amino - 5 - methylsulphonylmethyl-2-oxazolidinone.

9. N-(5'-nitro-2'-furfurylidene)-3-amino - 5 - ethylsulphonylmethyl-2-oxazolidinone.

10. N-(5'-nitro-2'-furfurylidene)-3-amino-5 - n -propylsulphonylmethyl-2-oxazolidinone.

11. N-(5'-nitro-2'-furfurylidene) - 3 -amino - 5 - isopropylsulphonylmethyl-2-oxazolidinone.

12. N-(-5'-nitro-2'-furfurylidene)-3-amino-5 - n- butylsulphonylmethyl-2-oxazolidinone.

References Cited by the Examiner
UNITED STATES PATENTS

| | | | |
|---|---|---|---|
| 2,511,838 | 6/1950 | Felsome | 167—58 |
| 2,556,567 | 6/1951 | Wright | 167—58 |
| 2,742,462 | 4/1956 | Geever | 260—240 |
| 2,802,002 | 8/1957 | Geever | 260—240 |
| 2,898,335 | 8/1959 | Michels | 260—240 |
| 3,004,888 | 10/1961 | Conover | 167—53.2 |
| 3,040,098 | 6/1962 | Stone | 260—583 |
| 3,102,144 | 8/1963 | Horvitz | 260—583 |

JOHN D. RANDOLPH, *Primary Examiner.*

JULIAN S. LEVITT, *Examiner.*

P. L. SABATINE, H. I. MOATZ, *Assistant Examiners.*